Feb. 19, 1963  T. Z. WHITE ET AL  3,077,927
COOLING SYSTEM
Filed May 2, 1960
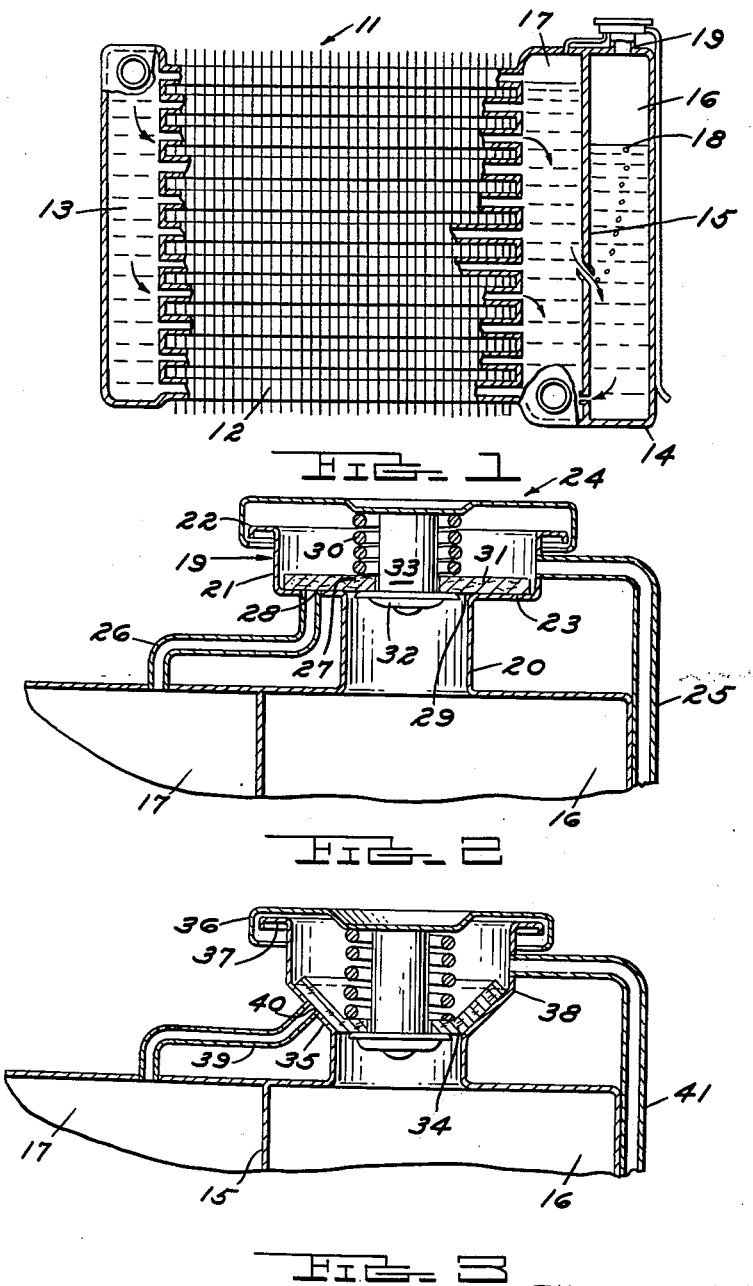
THEODORE Z. WHITE
CHARLES S. ASHBROOK, JR.
INVENTOR.
BY  J. R. Faulkner
J. H. Oster
ATTORNEYS

3,077,927
COOLING SYSTEM

Theodore Z. White, Dearborn, and Charles S. Ashbrook, Jr., Garden City, Mich., assignors to Ford Motor Company, Dearborn, Mich., a corporation of Delaware
Filed May 2, 1960, Ser. No. 26,066
4 Claims. (Cl. 165—72)

This invention relates to a radiator pressure cap and a radiator opening which is adapted to bleed air from an automotive cooling system when the cooling system is being filled with coolant and to assure that the optimum coolant level is obtained. The construction depicted in this invention is especially suited to a cooling system as shown in copending application Serial No. 25,684, filed on April 29. 1960, by Theodore Z. White and Robert M. Thorpe, inventors.

In the cooling system of the copending application, the filler neck is mounted on top of an air accumulation compartment which is utilized for filling the cooling system and to accumulate entrapped air separated from the coolant during the operation of the engine. Since the air accumulation compartment is separated from the main radiator body by a partition, an air pocket may possibly remain in the main radiator body on the other side of the partition. This entrapped air cannot escape through the filler neck on top of the air accumulation compartment due to the partition separating the compartment from the main radiator body. In order to permit filling the whole cooling system to its optimum level through the filler neck, it is necessary to bleed this air remaining in the main radiator body to prevent "air lock."

In the construction depicted in this invention the main radiator body can be bled of air when the cooling system is being filled by the installation of a bleeder tube from the hight point of the main radiator body to the filler neck. The pressure cap is designed to seal the cooling system from the atmosphere by the use of a gasket which seals the bleeder tube and the filler spout simultaneously. Upon removal of the pressure cap, the air is exhausted from the main radiator body as well as the air accumulation compartment.

The object of this invention is to eliminate the removal of a separate bleeder cap prior to filling the radiator. Another object is to combine the coolant filling and air bleeding operations for the convenience of the driver or garage attendant when servicing a motor vehicle utilizing the cooling system disclosed in copending application Serial No. 25,684, filed April 29, 1960.

Other objects and advantages will become apparent as this description proceeds, particularly when considered in connection with the accompanying drawings in which:

FIGURE 1 is a sectional view of a crossflow radiator with an air accumulation compartment incorporated in the radiator system showing the location of the bleeder tube, overflow tube, filler spout and pressure cap, and FIGURE 2 is a sectional view of the filler spout and pressure cap with a circular flat seal, and , FIGURE 3 is a sectional view of another embodiment of this invention in which a tapered seat is utilized.

In FIGURE 1 is seen a crossflow radiator 11 having radiator tubes 12 and a vertical header tank 13 on the intake side and a second vertical header tank 14 on the outlet side. The second vertical header tank 14 is divided by partition 15 into two compartments, an air accumulation compartment 16 remote from radiator tubes 12 and a flow compartment 17 adjacent to radiator tubes 12. As the coolant is circulated through radiator 11, entrapped air 18 in the coolant will be separated and accumulated in air accumulation compartment 15 as disclosed in copending application Serial No. 25,684, filed April 29, 1960.

The cooling system is filled through filler spout 19 (best shown in FIGURE 2). The filler spout 19 comprises a filler neck 20 mounted on air accumulation compartment 16, a filling tube 21 of a larger diameter than the filler neck 20 having a flange 22 at one end, and a seat 23 formed by the connection between filler neck 20 and the filling tube 21 on the other end. Pressure cap 24 can be of conventional construction to close filler spout 19 in respect to relieving pressure of the cooling system by rotating the pressure cap 24 one half turn to exhaust the pressurized coolant vapor through overflow tube 25 before removing it completely from the filler spout 19.

Bleeder tube 26 is installed to place flow compartment 17 in communication with the filler spout 19. Seal 27 of pressure cap 24 seats itself in seat 23 of filler spout 19. The seat 23 of filler spout 19 encompasses opening 28 of the bleeder tube 26 and opening 29 of filler neck 20. Bleeder tube 26 may be parallel with filler neck 27 and the openings 28 and 29 of the bleeder tube 26 and filler neck 20 respectively may be adjacent to each other as seen in FIGURE 2.

The bleeder tube 26 may also be installed at an angle to the filler neck 20, as seen in FIGURE 3. It is essential that seal 27 of pressure cap 24 seals openings 28 and 29 simultaneously to accomplish the desired results. When pressure cap 24 is removed for filling the cooling system, openings 28 and 29 are exposed to the atmosphere and the air entrapped in the main radiator and the air accumulated in the air accumulation compartment 16 is exhausted. When pressure cap 24 is replaced, bleeder tube 26 and filler neck 20 are tightly closed by seal 27 to permit pressurized operation of the cooling system and to prevent the intake of air into the radiator.

In FIGURE 2, seal 27 is urged into engagement with seat 23 by spring 30 when pressure cap 24 is locked into place on flange 32, sealing opening 28 of the bleeder tube 26 and opening 29 of filler neck 20. The seal 27 may comprise a gasket 31 which is held in place by a bottom plate 32 fastened to a supporting member 33 of pressure cap 24. Gasket 31 may be of a circular configuration and should be of sufficient thickness and strength to act on the surface of the seat 23 to seal off openings 28 and 29. The gasket 31 may be manufactured of any suitable flexible material commonly used for sealing purposes which will also resist the corrosive action of the cooling solution.

In FIGURE 3 is seen seal 34 which has tapered sides similar in configuration to a truncated cone. Seal 34 engages seat 35 when pressure cap 36 is rotated to a closed position on flange 37 attached to filler spout 38. The seat 35 also has tapered sides to receive seal 34 to form a tight seal when in engagement. A bleeder tube 39 places the main radiator in communication with the filler spout 38. The tapered portion of the seat 35 of the filler spout 38 encompasses opening 40 of bleeder tube 39. The tapered construction of seat 35, as shown in FIGURE 3, facilitates the filling of the cooling system by reducing spillage and clogging of the bleeder tube. By turning pressure cap 36 one half turn, seal 34 will lift itself off seat 35 and pressurized vapor can escape through overflow tube 41 as in the present pressurized cooling systems. After the pressure is relieved, pressure cap 36 can be completely removed by completing the turn on the flange 37 of the filler spout 38.

We claim:
1. An improved cooling system including a radiator, said radiator comprising horizontal cooling tubes, a first vertical header tank on one side of said horizontal cooling tubes, a second vertical header tank on the other side of said horizontal cooling tubes, a substantially vertical partition in one of said vertical header tanks dividing the latter into a filling chamber remote from said horizontal cooling tubes and a flow compartment adjacent to said horizontal cooling tubes, an opening in said partition remote from its top to place said filling chamber in communication with said flow compartment, an inlet in one of said vertical header tanks, an outlet in the other of said vertical header tanks, a filler spout for said filling chamber, seating means within said filler spout, a bleeder tube placing the upper portion of said filling chamber in communication with said seating means, a closure member for said filler spout, said closure member having sealing means, said sealing means sealingly engaging said seating means upon placing said closure member on said filler spout into a closed position to seal said filler spout and said bleeder tube simultaneously.

2. An improved cooling system including a radiator, said radiator comprising horizontal cooling tubes, a first vertical header tank on one side of said horizontal cooling tubes, a second vertical header tank on the other side of said horizontal cooling tubes, a substantially vertical partition in one of said vertical header tanks dividing the latter into a filling chamber remote from said horizontal cooling tubes and a flow compartment adjacent to said horizontal cooling tubes, an opening in said partition remote from its top to place said filling chamber in communication with said flow compartment, an inlet in one of said vertical header tanks, an outlet in the other of said vertical header tanks, a filler spout extending upwardly from said filling chamber, a seat within said filler spout encompassing an opening to said filling chamber, a bleeder tube having a first opening at one end received within the upper portion of said flow compartment and a second opening at the other end received within said seat, a closure member for said filler spout, said closure member having a seal, said seal sealingly engaging said seat upon placing said closure member on said filler spout into a closed position to seal said second opening of said bleeder tube and said opening within said filler spout simultaneously.

3. An improved cooling system including a radiator, said radiator comprising horizontal cooling tubes, a first vertical header tank on one side of said horizontal cooling tubes, a second vertical header tank on the other side of said horizontal cooling tubes, a substantially vertical partition in one of said vertical header tanks dividing the latter into a filling chamber remote from said horizontal cooling tubes and a flow compartment adjacent to said horizontal cooling tubes, an opening in said partition remote from its top to place said filling chamber in communication with said flow compartment, an inlet in one of said vertical header tanks, an outlet in the other of said vertical header tanks, a filler spout extending upwardly from said filling chamber, a seat within said filler spout, said seat having tapered surfaces, a bleeder tube, said bleeder tube placing the upper portion of said vertical header tank in communication with one of said tapered surfaces of the seat, a closure member for said filler spout, said closure member having a sealing means, said sealing means sealingly engaging the tapered surfaces of said seat upon placing said closure member on said filler spout into a closed position to seal said filler spout and said bleeder tube simultaneously.

4. An improved cooling system including a radiator, said radiator comprising horizontal cooling tubes, a first vertical header tank on one side of said horizontal cooling tubes, a second vertical header tank on the other side of said horizontal cooling tubes, a substantially vertical partition in one of said vertical header tanks dividing the latter into a filling chamber remote from said horizontal cooling tubes and a flow compartment adjacent to said horizontal cooling tubes, an opening in said partition remote from its top to place said filling chamber in communication with said flow compartment, an inlet in one of said vertical header tanks, an outlet in the other of said vertical header tanks, a first opening for said filling chamber, a filler spout extending upwardly from said first opening, a seat within said filler spout encompassing said first opening, a bleeder tube placing the upper portion of said flow compartment in communication with said seat, a second opening in the side of said filler spout above said seat to place said filler spout in communication with the atmosphere, a closure member for said filler spout, said closure member having sealing means, said sealing means sealingly engaging said seat upon placing said closure member on said filler spout into a closed position to seal said first opening in the filler spout and said bleeder tube simultaneously.

References Cited in the file of this patent

UNITED STATES PATENTS

| | | |
|---|---|---|
| 740,207 | White | Sept. 29, 1903 |
| 1,217,732 | Fedders | Feb. 27, 1917 |
| 1,558,009 | Giesler | Oct. 20, 1925 |
| 1,677,981 | Muir | July 24, 1928 |
| 1,795,878 | Mougey | Mar. 10, 1931 |
| 2,164,478 | Smith | July 4, 1939 |
| 2,182,338 | Gurlik | Dec. 5, 1939 |
| 2,672,131 | Wood | Mar. 16, 1954 |
| 2,799,260 | Butler | July 16, 1957 |
| 2,966,919 | Wood | Jan. 3, 1961 |